United States Patent Office 3,062,832
Patented Nov. 6, 1962

3,062,832
PROCESS FOR THE PRODUCTION OF 3-INDOLE-
PROPIONIC ACIDS
Herbert E. Johnson, South Charleston, W. Va., assignor
to Union Carbide Corporation, a corporation of New
York
No Drawing. Filed June 29, 1961, Ser. No. 120,470
3 Claims. (Cl. 260—319)

This invention relates to the production of 3-indole-propionic acids. More particularly, the process of this invention is directed to an improved process for the manufacture of 3-indolepropionic acid which comprises reacting an indole and an acrylic acid in the presence of a base.

Heretofore, according to customary practices for the manufacture of 3-indolepropionic acids, the process consisted of the reaction of indole and acrylonitrile to produce 3-indolepropionitrile purified by distillation, followed by hydrolysis to obtain the desired acid. Thus, this invention eliminates the step of purification of the nitrile and the subsequent hydrolysis step required when using acrylonitrile as the starting material. Other methods known for producing 3-indolepropionic acids include the reaction of beta-propiolactone with indole (J. Harley-Mason, Chemistry & Industry, 1951, 886); the base catalyzed reaction of beta-dialkyl-aminomethyl indoles or their methiodides with diethyl malonate, ethyl acetoacetate or ethyl cyanoacetate followed by hydrolysis and subsequent decarboxylation (U.S. Patents 2,451,310 and 2,468,912); and via the classical Fischer Indole Synthesis using the phenyl hydrazone of diethyl alpha-ketoadipate, followed by hydrolysis and decarboxylation (L. Kalb, F. Schweitzer, H. Zellner and E. Berthold, Ber. 59B, 1860 (1926); S. Keimatsu and S. Sugasawa, C.A. 23, 834[5,6] (1929); K. Tamari, ibid. 34, 6939[6] (1940); V. V. Feofilakotov, ibid. 42, 4538[e] 1948), ibid. 48, 666[g] (1954)).

In the German Patent 698,273 and French Patent 48,570 addition to French Patent 742,358, acrylic acid and indole have previously been reported to react, in the absence of a solvent, at 120–130° C. to give a quantitative yield of 1-indolepropionic acid as follows:

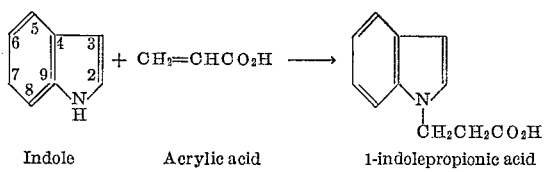

It has now been discovered that 3-indolepropionic acids can be very easily produced by reacting an indole and an acrylic acid in the presence of a base. The novel process of this invention utilizes readily available starting materials, is easy to install and maintain, simple to operate and produces 3-indolepropionic acids in good yields and high efficiencies. The novel process of this invention enables one to obtain 3-indolepropionic acids in yields of 80 percent and efficiencies of 90 percent based on the indole employed.

The novel process of this invention can be represented by the following reaction scheme:

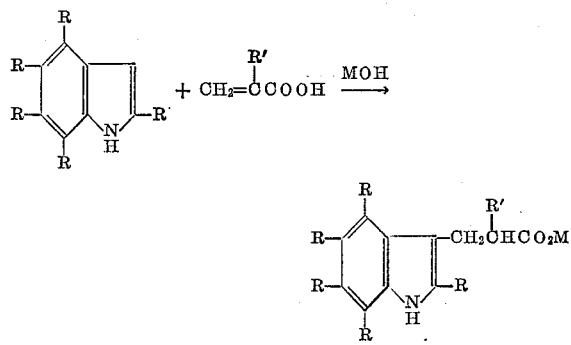

wherein each R is individually selected from the group consisting of hydrogen, alkyl groups, carboxyl groups and phenolic groups and R' represents hydrogen or alkyl groups and M represents potassium, sodium, calcium, lithium, barium, etc.

The temperature at which the process of our invention is carried out is not narrowly critical and temperatures in the range of 225° C. and lower to 300° C. and higher are operable. However, it is preferred to carry out the reaction at temperatures from 250–280° C. The ratio of indole to the acrylic acid is not narrowly critical and an excess of either reactant can be employed. However, for economic considerations, it is preferred to employ substantially a 1:1 molar ratio.

The amount of catalysts employed is not narrowly critical with the exception that an excess of catalyst must be employed based on the amount of acrylic acid employed. Thus, the novel process of this invention makes its possible to use any amount of catalyst as long as it is in excess of the acrylic acid. The length of time under which the reaction is conducted is also not narrowly critical and varies over a wide range. However, it is preferred to carry out the reaction for a period of time within the range of 0.5–22 hours since at this time range better yields are obtained.

The 3-indolepropionic acid can be recovered from the reaction product merely by conventional techniques. Thus, the metallic salt of the acid can be dissolved in water, treated with ether to remove the unreacted indole and then acidified to precipitate the desired acid. It is to be understood that the novel process of this invention can be carried out in the presence of a solvent, although it is not necessary. Any solvent which is inert to the reactants at the particular reaction conditions can be employed. Examples of these solvents include water, aliphatic hydrocarbons, aromatic hydrocarbons and ethers.

It is to be pointed out that 3-indolepropionic acids are well known in the art and have a wide variety of uses. It is obvious that, aside from the art-recognized uses, these acids are useful in the same manner as any ordinary acid would be.

The following examples will illustrate the novel process of this invention.

EXAMPLE 1

3-Indolepropionic Acid

A charge of 234 grams (2.0 mols) of indole, 158 grams (2.2 mols) of acrylic acid and 180 grams (2.7 mols) of commercial (85% purity) potassium hydroxide was heated at 250° C. in a 3 l. stainless steel rocker autoclave under autogenous pressure for 17 hours. The reaction mixture was cooled below 100° C., 500 ml. of water was added and the mixture held at 100° C. for 30 minutes to dissolve the potassium salt of the desired product. The mixture was again cooled; filtered to remove unreacted indole and acidified to about pH 1 with concentrated hydrochloric acid. After collecting the precipitated solids they were dried to yield 303 grams (80%) of crude brown indolepropionic acid, M.P. 102–121° C. A sample was crystallized from water several times to glistening-white needles, M.P. 130–132° C. A mixed M.P. with an authentic sample of indolepropionic was undepressed and the infrared spectra of the two samples were found to be identical in detail.

EXAMPLE 2

3-Indolepropionic Acid

In the manner described in Example 1

234 grams (2.0 mols) of indole
108 grams (2.7 mols) of sodium hydroxide
130 grams (1.8 mols) of acrylic acid were reacted to give 260 grams of light-brown indolepropionic acid, M.P. 122–127° C. Ether extracts of the original make yielded 49 grams (21% recovery) of pure indole upon distillation. The yield fo product based on indole recovered is 69 percent and 76.5 percent based on acrylic acid. Indole efficiency is 90 percent.

EXAMPLE 3

α-Methyl-β-3-Indolepropionic Acid

In the manner described in Example 1

234 grams (2.0 mols) of indole
172 grams (2.0 mols) of methacrylic acid
180 grams (2.7 mols) of 85 percent potassium hydroxide were reacted at 280° C. for 19 hours to give 244 grams of product, M.P. 109–119° C. A sample of material from an equivalent experiment was purified by crystallization from water to give pure α-methyl-β-3-indolepropionic acid as off-white short needles, M.P. 127–129° C.

Analysis for $C_{12}H_{13}NO_2$:

|  | C | H | N |
|---|---|---|---|
| Calculated | 70.91 | 6.45 | 6.89 |
| Found | 70.88 | 6.38 | 6.80 |

EXAMPLE 4

2-Methylindole-3-Propionic Acid

A mixture of 13 grams (0.1 mol) of 2-methylindole, 8 grams (0.11 mol) of acrylic acid and 8 grams (0.20 mol) of sodium hydroxide was charged to a 150 ml. stainless steel autoclave and was heated with agitation at 250° for 18 hours. At this time the autoclave was cooled and the mixture dissolved with about 200 ml. of water. After extraction of the water with ether, it was acidified to yield 20 grams of crude product. Crystallization from water afforded 6.0 grams of nearly colorless crystals, M.P. 132–134° C. Further crystallization gave an analytical sample as off-white needles, M.P., 135–136° C.

Analysis for $C_{12}H_{13}NO_2$:

|  | C | H | N |
|---|---|---|---|
| Calculated | 70.91 | 6.45 | 6.89 |
| Found | 70.88 | 6.54 | 6.84 |

EXAMPLE 5

2,5-Dimethylindole-3-Propionic Acid

In the manner described in example 4, 5.0 grams (0.029 mol) of 2,5-dimethylindole, 2.5 grams (0.035 mol) of acrylic acid, 3.0 grams (0.075 mol) of sodium hydroxide and 40 ml. of water were heated at 250° C. for 17 hours. Upon acidification of the reaction mixture 3.0 grams of light-tan product was obtained, M.P. 169–178° C. Crystallization from water-ethanol afforded an analytical sample as slightly pink needles, M.P. 180–181° C.

Analysis for $C_{13}H_{15}NO_2$:

|  | C | H | N |
|---|---|---|---|
| Calculated | 71.86 | 6.96 | 6.45 |
| Found | 71.82 | 7.17 | 6.38 |

What is claimed is:

1. A process for the production of 3-indolepropionic acids which comprises reacting an indole and an acid selected from the group consisting of acrylic acid and methacrylic acid at a temperature of from 225° C. to 300° C. in the presence of an excess of a catalyst, based on the amount of acid employed, selected from the group consisting of sodium hydroxide, potassium hydroxide, barium hydroxide, lithium hydroxide and calcium hydroxide.

2. The process of claim 1 wherein the reaction is carried out from 0.5–22 hours.

3. The process of claim 2 wherein the temperature is from 250°–260° C.

References Cited in the file of this patent

UNITED STATES PATENTS 2,195,974    Reppe et al.    Apr. 2, 1940

FOREIGN PATENTS 698,273    Germany    Nov. 6, 1940